UNITED STATES PATENT OFFICE.

ALBERT LEACH, OF LYNN, MASSACHUSETTS.

IMPROVEMENT IN CEMENTS FOR LEATHER.

Specification forming part of Letters Patent No. 59,774, dated November 20, 1866; reissue No. 6,935, dated February 15, 1876; application filed March 12, 1875.

*To all whom it may concern:*

Be it known that I, ALBERT LEACH, of Lynn, Massachusetts, have invented a certain Composition or Cement for uniting, by virtue of its adhesive properties, different pieces or parts of leather into one strongly cohesive piece or part, of which the following is a specification:

The herein-described cement is made in the manner specified, as follows: I dissolve one pound of caoutchouc in about two gallons of benzine; the benzine vaporizes very quickly, and thus produces a rapidly-drying adhesive cement, which quality of rapid drying is very desirable in all cements used for leather. I have ascertained also, by experience, that caoutchouc obtained from different localities—as for instance from Central America and Brazil—when mixed together, say, in the proportion of four parts of the former to one of the latter, will produce a better cement than if caoutchouc from but one locality only be used. But when caoutchouc of inferior quality is dissolved in the benzine, the body and drying qualities of the cement thus made need improving or fortifying. In such case, in order to accomplish the desired result, I incorporate in the solution above described a mixture of ivory-black and sulphuric acid, in the proportion of, say, one-quarter of a pound of ivory-black to one ounce of sulphuric acid. This addition of ivory-black will supply the necessary body wanting in the solution, and also add to its drying quality. The sulphuric acid, while refining the ivory-black and destroying all oily and gritty matter therein, also hastens the drying and hardening of the cement.

I do not confine myself to the exact proportions of the ingredients herein mentioned, as they may be somewhat varied without materially affecting the result arising from their combination.

The cement herein described is of great value in the shoe manufacture, particularly for sticking together or fastening down the lips of shoe-channels.

Having thus fully described this cement and its mode of manufacture, as of my invention, I claim—

A composition consisting of caoutchouc dissolved in benzine treated with ivory-black and sulphuric acid, substantially as and for the purpose set forth, the whole forming a cement for articles of leather, and combined in manner and proportions substantially as hereinbefore described.

ALBERT LEACH.

Witnesses:

GEORGE H. WARREN,
CHAS. H. DREW.